Figure 2:
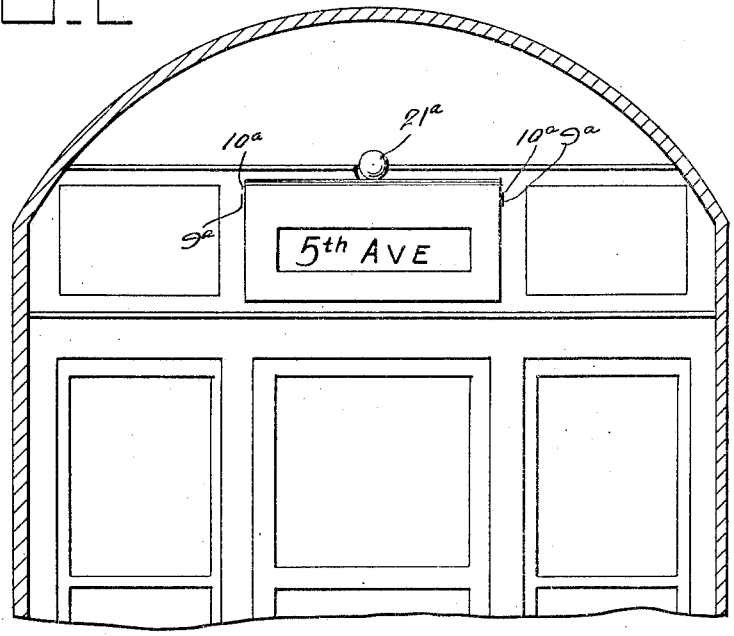

D. W. ADAMS.
STATION INDICATOR FOR ELECTRIC STREET CARS.
APPLICATION FILED AUG. 14, 1915.
1,357,934.
Patented Nov. 9, 1920.
4 SHEETS—SHEET 1.
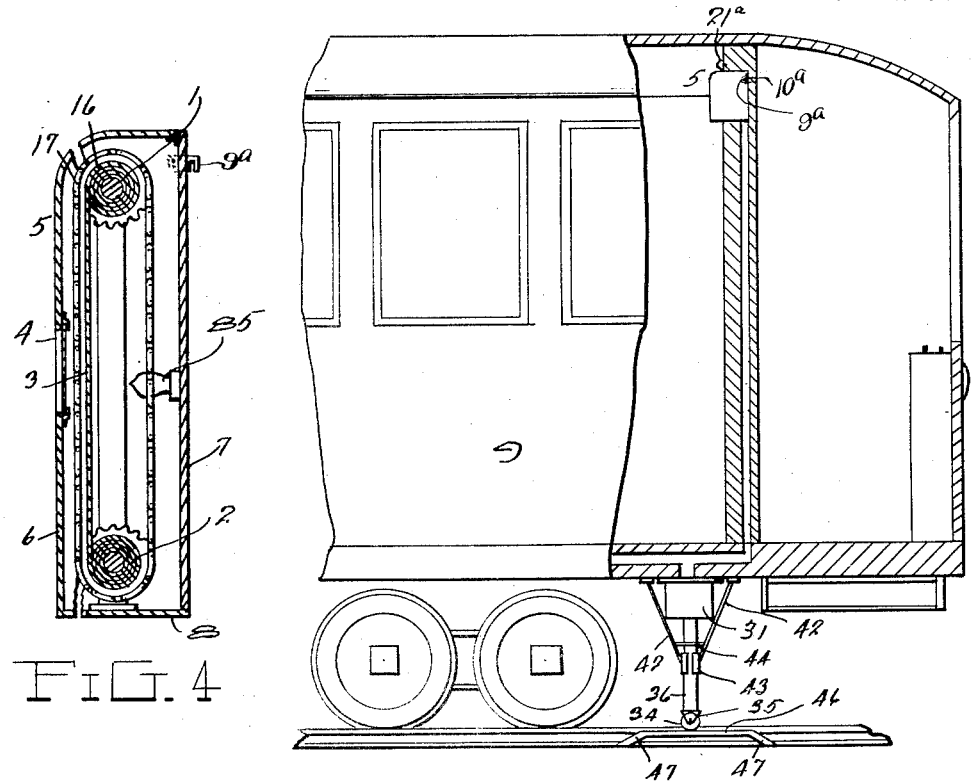
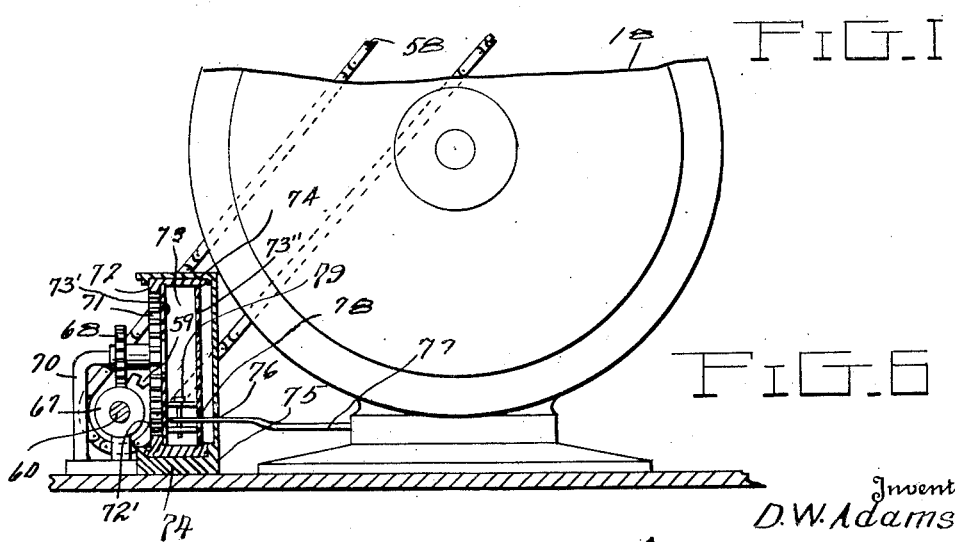
Inventor
D. W. Adams
Witnesses D. W. ADAMS.
STATION INDICATOR FOR ELECTRIC STREET CARS.
APPLICATION FILED AUG. 14, 1915.

1,357,934.

Patented Nov. 9, 1920.
4 SHEETS—SHEET 2.

Witnesses
Chas. H. Trotter
H. T. Riley

Inventor
D. W. Adams
By T. Randolph Jr.
Attorney

D. W. ADAMS.
STATION INDICATOR FOR ELECTRIC STREET CARS.
APPLICATION FILED AUG. 14, 1915.
1,357,934.
Patented Nov. 9, 1920.
4 SHEETS—SHEET 3.
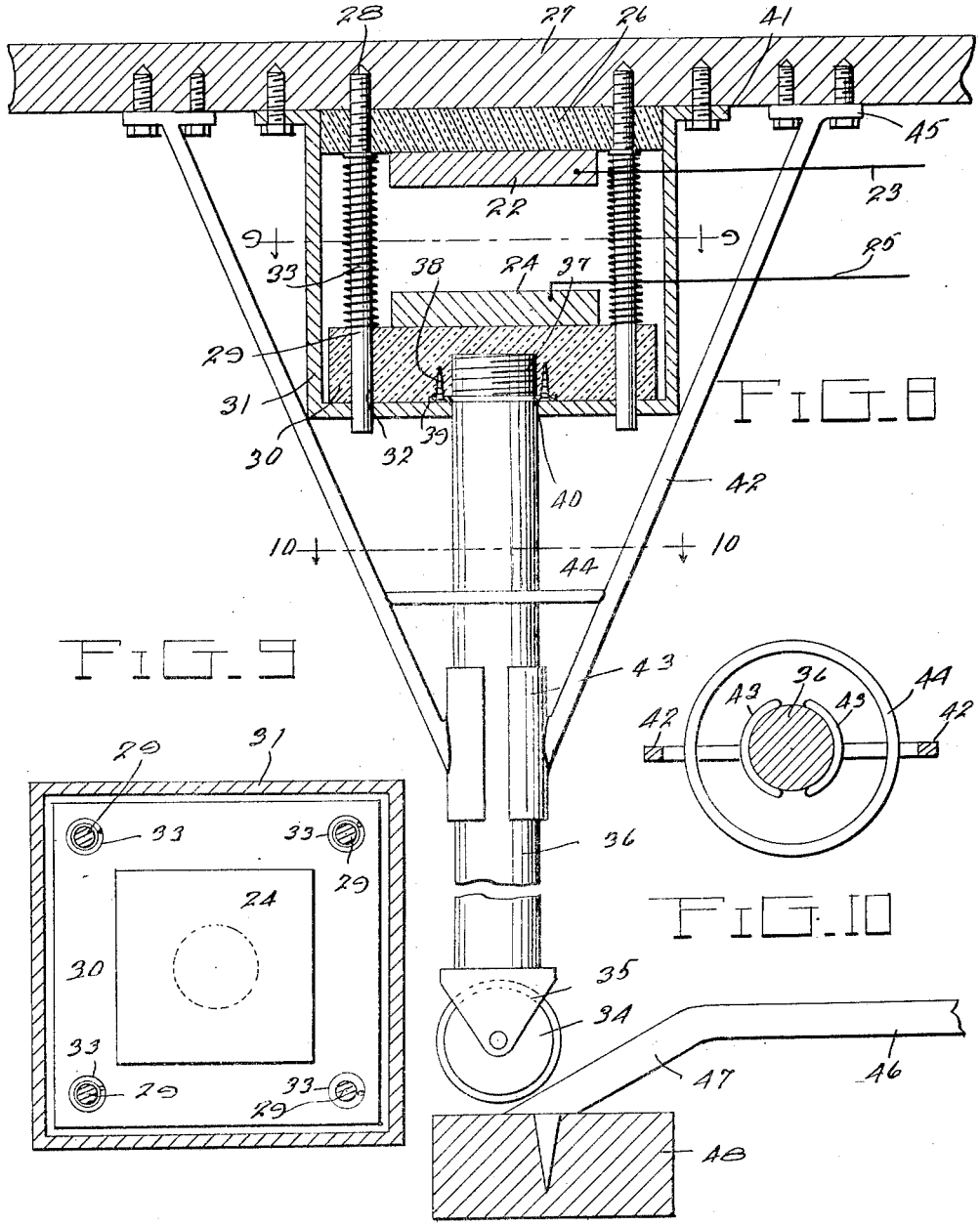

D. W. ADAMS.
STATION INDICATOR FOR ELECTRIC STREET CARS.
APPLICATION FILED AUG. 14, 1915.
1,357,934.
Patented Nov. 9, 1920.
4 SHEETS—SHEET 4.
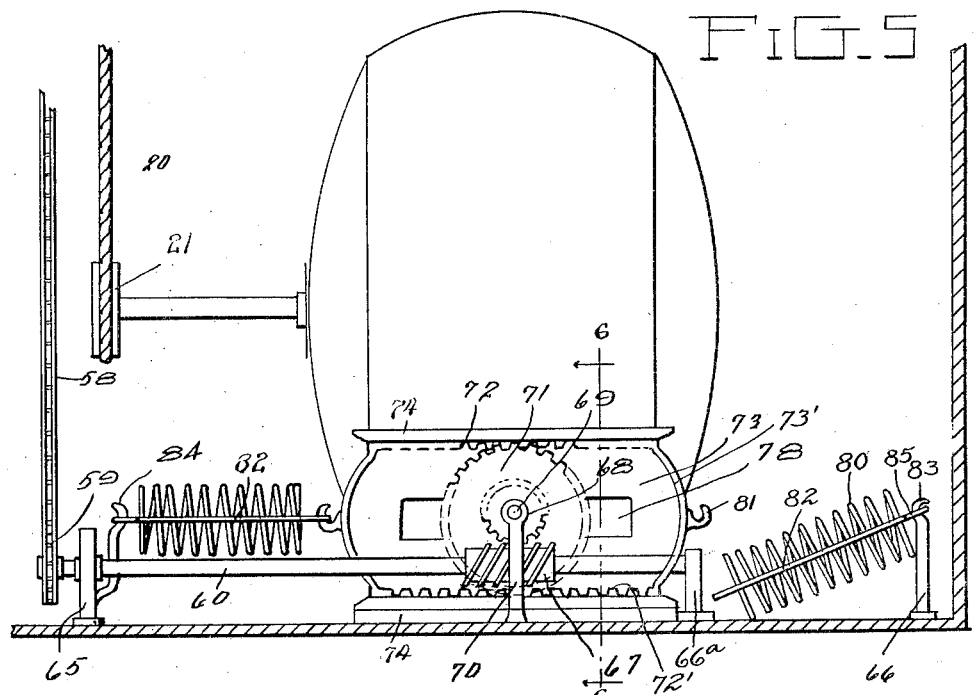
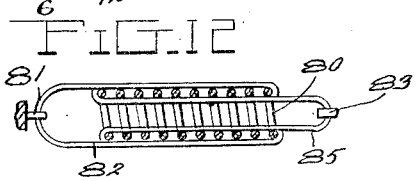
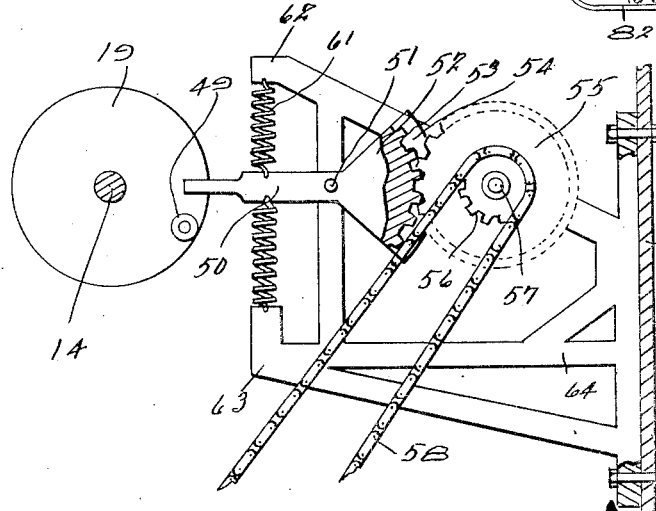
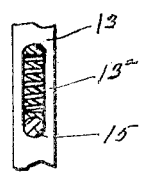
Witnesses
Chas. H. Trotter
H. H. Ely
Inventor
D. W. Adams
By ........... Attorney

UNITED STATES PATENT OFFICE.

DAVID W. ADAMS, OF SAN FRANCISCO, CALIFORNIA, ASSIGNOR OF FORTY PER CENT. TO JIM CLEVELAND, OF SAN FRANCISCO, CALIFORNIA.

STATION-INDICATOR FOR ELECTRIC STREET-CARS.

1,357,934.  Specification of Letters Patent.  Patented Nov. 9, 1920.

Application filed August 14, 1915. Serial No. 45,531.

*To all whom it may concern:*

Be it known that I, DAVID W. ADAMS, a citizen of the United States, residing at San Francisco, in the county of San Francisco and State of California, have invented certain new and useful Improvements in Station-Indicators for Electric Street-Cars; and I do hereby declare the following to be a full, clear, and exact description of the invention, such as will enable others skilled in the art to which it appertains to make and use the same.

The invention relates to improvements in station indicators for electric street cars and other conveyances.

The object of the present invention is to improve the construction of station indicators and to provide a simple, practical and comparatively inexpensive device adapted to be readily mounted on a car and capable of automatic operation to indicate the stations and other stopping points along the route of the car and adapted also to operate an audible signal for calling the attention of the passengers to the next stop or station when the indicator changes.

A further object of the invention is to provide a street car indicator of this character adapted to be operated by an electric motor equipped with means for automatically cutting off the current and stopping the motor when there has been a predetermined movement of the rollers which carry the strip or ribbon bearing the names of the stations so that an accurate movement thereof will be obtained.

Another object of the invention is to provide motor controlling mechanism adapted to be arranged for operating the motor to move the strip or ribbon in either direction so that the mechanism may be conveniently set at the end of the route for a reverse movement of the strip or ribbon.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings—

Figure 3:
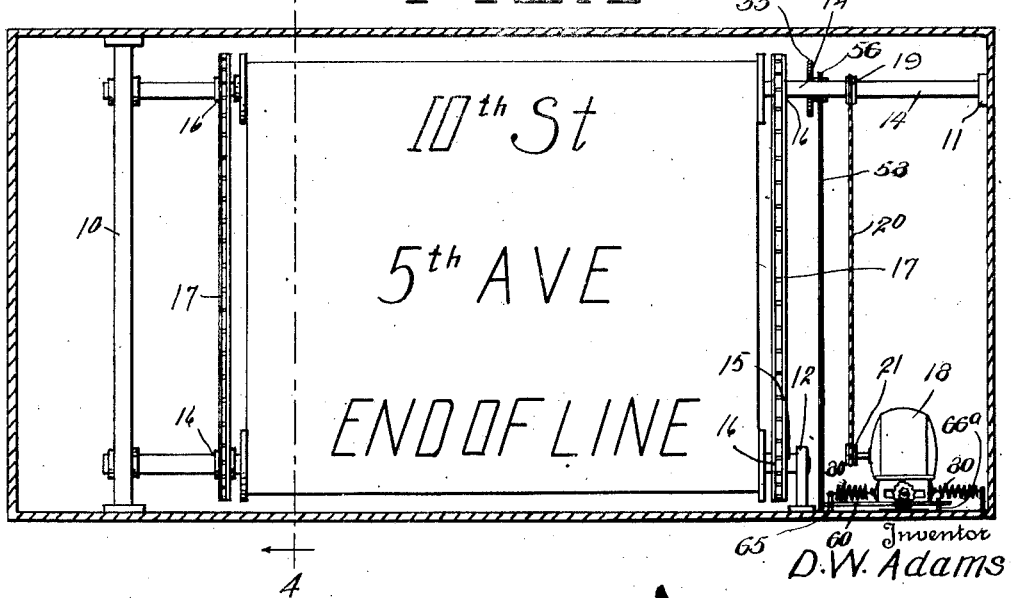

Figure 1 is a side elevation of a street car station indicator constructed in accordance with this invention and shown applied to a car, the latter being partly broken away, Fig. 2 is a transverse sectional view of a portion of the car illustrating the arrangement of the station indicator, Fig. 3 is a vertical sectional view of the station indicator on a larger scale, the mechanism being shown in elevation, Fig. 4 is a vertical sectional view of the same on the line 4—4 of Fig. 3, Fig. 5 is an enlarged elevation partly in section illustrating the construction of the motor controlling mechanism, Fig. 6 is a vertical sectional view of the same taken substantially on the line 6—6 of Fig. 5, Fig. 7 is an enlarged sectional view illustrating the construction of the gearing for actuating the motor controlling mechanism, Fig. 8 is an enlarged detail sectional view illustrating the construction of the circuit closing means, Fig. 9 is a horizontal sectional view of the same on the line 9—9 of Fig. 8, Fig. 10 is a similar view on the line 10—10 of Fig. 8, Fig. 11 is an enlarged detail sectional view illustrating the manner of mounting the lower roller, Fig. 12 is a detail sectional view illustrating the construction of the springs of the motor controlling mechanism.

Like numerals of reference designate corresponding parts in all the figures of the drawings.

In the accompanying drawing in which is illustrated the preferred embodiment of the invention, the station indicator comprises in its construction upper and lower rollers 1 and 2 and a flexible strip or ribbon 3 bearing the names of the stations or stopping places of the route on which it is used and connected with the upper and lower rollers and adapted to be unwound from one and wound on the other to present the names of the stations or stopping places successively at an aperture 4 of a casing 5. The casing 5 which may be of any desired construction is preferably provided with a hinged front 6 and a wooden back or supporting portion 7 which carries the bottom 8.

In practice the casing is designed to be detachably mounted in position within a car 9 by hooks 9ª and eyes or staples 10ª or other suitable fastening means to enable it to be transferred from one end of the car to the other when it is necessary as for instance at points where the cars are not turned end for end at the terminals of a route. The upper and lower rollers are journaled in bearings of a standard 10 and brackets 11 and 12, suitably secured within the casing and in order to compensate for any variation in the diameters of the upper and lower rollers and the flexible strip or ribbon as the same is unwound from one of the rollers and rewound on the other, the lower bearings are designed to consist of vertical slots 13, springs 13ª being preferably employed for urging the lower roller downwardly but any other suitable means may of course be employed and in practice such variation will be comparatively slight owing to the thickness of the flexible strip or ribbon.

Mounted upon the upper and lower shafts 14 and 15 of the upper and lower rollers are sprocket wheels 16 which are connected by sprocket chains 17 for causing a simultaneous rotation of the upper and lower rollers when the upper shaft 14 is rotated by a motor 18, mounted within the casing of the station indicator. The upper shaft 14 is extended at one side and the upper bracket 11 is mounted at one of the side walls of the casing. The extended portion of the shaft 14 carries a grooved pulley 19 which is connected by a belt 20 or other suitable flexible connection with a pulley 21 mounted on the shaft of the motor. By this construction the upper shaft is rotated when the motor is operated. The motor is arranged in circuit with a bell 21ª which is sounded while the motor is in operation and when the strip or ribbon is being carried past the aperture of the casing, so as to notify passengers of the change in the position of the strip or ribbon of the indicator so that they will have ample notice of the next stop of the car and may have plenty of time to notify the conductor or motorman of an intention to leave the car at such station or stopping place. One of the wires of the motor leads to an upper contact 22 which is suitably connected with such wire 23 and which coacts with a lower vertically movable contact 24 connected by a wire 25 with a battery or other source of electric current supply, not shown, carried by the car. The battery or other current supply is also connected with the bell whereby when the circuit is closed the motor will be operated and the bell sounded. As the wiring just explained is exceedingly simple, a diagram thereof is believed to be entirely unnecessary. The upper and lower contacts preferably consist of plates of copper or other suitable material. The upper contact plate 22 is suitably secured to the lower face of a supporting plate 26 which is secured to the lower face of one of the wooden frame members 27 of the car by the upper threaded terminals 28 of rods 29 which depend from the car and form guides for the support 30 of the lower vertically movable contact 24. The upper supporting plate 26 is preferably rectangular and the depending vertically disposed rods are arranged at the corners of the said supporting plates. The support which is arranged within a hanger or casing 31 preferably consists of a block of wood, fiber or any other suitable material and it is provided at its corners with openings 32 for the reception of the depending guide rods which extend through and project a suitable distance below the bottom of the casing or hanger 31 as clearly illustrated in Fig. 8 of the drawings. The rods 29 form supports for coiled springs 33 interposed between the upper supporting plate 26 and the lower insulating block or member 30 and adapted to move the lower contact plate 24 out of engagement with the upper contact plate when the parts are free to move downwardly.

The lower contact plate is forced upwardly to close the circuit by means of a roller or wheel 34 mounted between depending ears or flanges 35 of a vertically slidable standard 36 having a threaded upper end 37 which is screwed into the insulating block or member 30. The standard is also secured to the insulating block by screws 38 or other suitable fastening devices which pass through a collar or flange 39 of the said standard, but any other suitable means may of course be employed for securing the upper end of the standard to the insulating block or member which carries the lower contact plate. The hanger or casing which is adapted to protect the switch formed by the contact plates is provided in its bottom with an opening 40 for the passage of the vertically movable standard and it has upper attaching flanges 41 which are suitably secured to the frame work of the car.

The lower portion of the standard is braced and held against movement either laterally or longitudinally of the car by means of inclined braces 42 provided at their lower ends with vertically disposed jaws or flanges 43 which partially embrace the vertically movable standard 36. The vertically movable standard 36 is preferably round and the jaws 43 are curved to conform to the configuration of the same. The inclined braces 42 which are preferably connected by an integral horizontally disposed bracing ring 44 are provided at their upper ends with attaching portions 45 which are also secured to the frame work of the car as clearly illustrated in Fig. 8 of the drawings. The standard is forced upwardly by an auxiliary rail 46 having inclined terminal portions 47 which are suitably secured to the adjacent ties 48 or other suitable supports. The auxiliary rail may be of any desired length to secure an operation of the motor sufficient to move the flexible strip or ribbon and the said motor is controlled by means about to be described for preventing too great a movement of the said strip or ribbon.

The grooved pulley 19 of the upper horizontal shaft 14 is provided with an eccentrically arranged projection preferably consisting of a roller 49 which is adapted to engage one arm of a lever 50 fulcrumed at an intermediate point at 51 and provided at its other arm with a segmental or sector-shaped head 52 having peripheral teeth 53 and side flanges 54. The teeth 53 of the lever 50 mesh with a gear wheel 55 extending between the flanges 54 and carrying a sprocket wheel 56. The gear wheel 55 is mounted on a horizontal shaft 57 and the sprocket pinion 56 is connected by a sprocket chain 58 with a sprocket wheel 59 of a horizontal shaft 60.

The outer or front arm of the lever 50 is connected with upper and lower coiled springs 61 which are adapted to maintain the lever normally in a horizontal position and to return the lever to such position after the said lever has been operated and is released and free to move to such central position. The springs 61 which are located above and below the lever 50 are secured at their outer terminals to fixed projecting portions 62 and 63 of the supporting bracket in which the lever and the shaft 57 are mounted. This bracket 64 which may be of any desired construction is suitably secured to the back of the casing of the station indicator.

The horizontal shaft 60 which is journaled in suitable bearings of brackets 65 and 66ª is provided with a central worm 67 which meshes with a worm wheel 68 mounted on a stub shaft 69 of a short standard 70 and connected with a pinion or gear 71 which meshes with upper and lower teeth 72 and 72' of a two-part slidable rack bar or member 73. The slidable rack bar or member 73 which is movable horizontally in suitable guides 74 at the upper and lower portions of a casing or support 75 which is mounted upon the bottom of the indicator casing is located in front of the motor and is provided with a slot or opening 76 through which the switch lever 77 of the motor 18 extends. The motor is designed to be constructed so that the movement of the switch lever 77 from a central position to one side will cause a rotation of the motor shaft in one direction and the movement of the switch lever from a central position to the other side will cause a reverse rotation of the shaft of the motor. Movement of the gearing of the motor controlling mechanism is sufficient to carry the switch lever from either of the motor operating positions to the central neutral position.

The switch lever 77 extends through an opening 78 of the ears carried by one of the sections of the slidable rack bar 73 and is secured in the rack bar 73 by the pin 79. The movement of the rack bar from the limit of its movement in either direction to a central position is adapted to compress one of a pair of coiled springs 80 and 80' located at opposite sides of the switch lever and connected at their inner ends with hooks 81 and 81' of the rack bar by rods 82 and with relatively fixed hooks 83 and 84 by rods 85. While both of the coiled springs 80 and 80' are shown in position in Fig. 5 of the drawings only one will be in actual use as the other will be disconnected but will be in position for use so that the spring may be connected with either end of the rack bar 73 as required. The spring which is compressed through the operation of the said rods by the movement of the rack bar to a central position is adapted to return the rack bar to its normal position at one of the starting points of the motor and the coiled springs 61 are adapted to assist in this movement by returning the lever 50 to a central position. This moves the gearing of the motor controlling mechanism in the opposite direction from that in which it is moved by the eccentrically arranged wheel of the pulley 19. By the time the spring slowly moves the rack bar 73, gear wheels 71, arms 67, etc., the motor switch-lever 77 is returned to its starting position, the wheel 34 will have left the auxiliary rail to cause an opening of the circuit through the separation of the upper and lower contacts 22 and 24. At night the flexible strip or ribbon is designed to be illuminated by one or more electric lights 85 preferably red, but white or any other color may of course be employed and the said lights will in practice be arranged on a separate lighting circuit. The two part slidable rack bar 73 includes a forward slide plate 73' which carries the upper rack teeth 72 and the hook 81, while the rear plate 73" carries the lower rack teeth 72' and the hook 80', the plates 73' and 73" having interlocking sliding engagement with the guides 74 of the casing 75, as shown in Fig. 6 of the drawings.

In operation of the improved device, the auxiliary rails 46 are formed relatively long and are positioned adjacent each street corner and are plainly marked and as the car approaches the same the motorman cuts down the speed of the car, as is usual in approaching street crossings, so that each car will approach the auxiliary rails at a uniform rate of speed, and as the car reaches the auxiliary rails, the standard 36 will be forced upward and thus close the circuit and start the motor which will rotate the shaft 14 and thus operate the ribbon 3.

The rotation of the shaft 14 turns the pulley 19 and when the same makes a complete revolution, the roller 49, which is normally positioned below the lever 50, will engage the top surface of the lever and swing the same on its pivot, which will, through the medium of the gears and sprocket chains, etc., move the foot lever 77 against the tension of the spring 80 to neutral position and thus prevent further operation of the motor and the ribbon 3, and the roller 49, while the rack bar is moving to operate the lever 77 to neutral position, will ride past the lever 50 by the momentum of the pulley 19 and release the lever 50, and the roller 49 will then be in a position for another operation. The spring 80 slowly moves the rack bar 73, gear wheel 71, arm 67, etc., back to normal position and by the time the motor is returned to its starting position, the wheel 34 will have left the auxiliary rails. The spring 80' is disconnected from the hook 81' of the rear plate 73" of the slidable rack bar 73, thereby leaving only the spring 80 connected with the hook 81' of the forward slide plate 73' of the slidable rack bar 73 to act in returning the motor switch lever 77 to one of its closed positions and from which position the lever 77 has been moved by operation of the worm 67, previously described. When it is desired to reverse the direction of rotation of the motor 18, the switch lever 77 is disconnected from the forward slide plate 73' and connected with the rear slide plate 73". The spring 80 is disconnected from the hook 81. The spring 80' is then connected with the hook 81' of the rear slide plate 73". The motor switch lever 77 is moved to the opposite side before being secured to the rear slide plate 73". It will be readily seen that while both the forward plate 73' and the rear slide plate 73" are moved in opposite directions upon each operation of the device, only one slide plate of the two-part slidable rack bar 73 will be acting to place the spring connected therewith under tension so that the plates may be returned to normal or neutral position upon reaction of the spring connected with one of the slide plates. It is evident that both of the slide plates of the two-part slidable rack bar 73 must move each time the gear wheel 71 is rotated owing to the teeth thereof meshing with both of the rack teeth, one of which is carried by each of the slide bars, as is clearly shown in Figs. 5 and 6 of the drawings. The spring 80 is of such tension that considerable time is expended in moving the motor and other parts back to normal position, so that no matter how long the rail is formed the circuit closing device will have left the same, before the motor will have been returned to its starting position.

What is claimed is:—

1. A station indicator including spaced rollers, a flexible strip or ribbon connected with and adapted to be wound on and unwound from the rollers, an electric motor, means operatively connecting the motor with the rollers, mechanism connected with the switch of the motor and with the roller operating means for automatically stopping the motor after a predetermined movement of the rollers and means for automatically returning the motor switch to its initial position.

2. A station indicator including spaced rollers, a flexible strip or ribbon connected with and adapted to be wound on and unwound from the rollers, an electric motor, means operatively connecting the motor with the rollers, motor controlling mechanism including an oscillatory element, means carried by the said roller operating means for actuating the said element, mechanism for connecting the said element with the switch of the motor for stopping the latter after a predetermined movement of the rollers, and yieldable means for returning the said member to its initial position.

3. A station indicator including spaced rollers, a flexible strip or ribbon connected with and adapted to be wound on and unwound from the rollers, an electric motor, means operatively connecting the motor with the rollers, motor controlling mechanism including an oscillatory lever, means carried by the said roller actuating means for actuating the lever, means for transmitting motion from the lever to the switch of the motor for stopping the latter after a predetermined movement of the rollers, and springs connected with the lever for returning the same to its initial position and for yieldably maintaining the same in such position.

4. A station indicator including spaced rollers, a flexible strip, or ribbon connected with and adapted to be wound on and unwound from the rollers, an electric motor, means operatively connecting the motor with the rollers, and motor controlling mechanism including an oscillatory lever having a segmental head provided with peripheral teeth, a slidable rack bar connected with the switch of the motor and gearing meshing with the rack bar and with the teeth of the lever, and means carried by the gearing for rotating the rollers to actuate the said lever.

5. A station indicator including spaced rollers, a flexible strip, or ribbon connected with and adapted to be wound on and unwound from the rollers, an electric motor, means operatively connecting the motor with the rollers, and motor controlling mechanism including an oscillatory lever having a segmental head provided with peripheral teeth, a slidable rack bar connected with the switch of the motor, and springs connected with the rack bar for returning the parts to their initial position.

6. A station indicator of the class described including spaced rollers, a flexible strip or ribbon connected with the rollers, an electric motor, means operatively connecting the electric motor with the rollers, a rack bar connected with the switch of the motor and gearing meshing with the rack bar and connected with the said motor and roller connecting means actuating the switch of the motor.

7. A station indicator of the class described including spaced rollers, a flexible strip or ribbon connected with the rollers, an electric motor, means operatively connecting the electric motor with the rollers, a slidable member connected with the switch of the motor and means connected with the said roller operating means for actuating the said member.

8. A station indicator of the class described including spaced rollers, a flexible strip or ribbon connected with the rollers, an electric motor, means operatively connecting the electric motor with the rollers, a slidable member connected with the switch of the motor, means connected with the motor and roller connecting means for actuating the said member, and means for automatically returning the slidable member and switch to their initial position.

9. A station indicator of the class described including spaced rollers, a flexible strip or ribbon connected with the rollers, an electric motor, means operatively connecting the electric motor with the rollers, a slidable member, springs located at opposite sides of the slidable member for moving the same in one direction, means for connecting the slidable member with the switch of the motor, and mechanism actuated by the said roller operating means for moving the member.

10. A station indicator of the class described including spaced rollers, a flexible strip or ribbon connected with the rollers, an electric motor, means operatively connecting the electric motor with the rollers, a slidable rack bar connected with the switch of the motor, guiding means for the rack bar, a gear wheel meshing with the rack bar and worm gearing connected with the said gear wheel and with the roller actuating means for actuating the said rack bar.

11. A station indicator of the class described including spaced rollers, a flexible strip or ribbon connected with the rollers, an electric motor, means operatively connecting the electric motor with the rollers, a slidable member connected with the switch of the motor and provided at its ends with engaging portions, springs detachably connected with the said engaging portions of the said member, and mechanism operated by the said roller operating means for moving the member in one direction.

12. A station indicator of the class described including spaced rollers, a flexible strip or ribbon connected with the rollers, a motor having a switch movable from a point in opposite directions to rotate the motor shaft in both directions, a shiftable member connected with the motor, means operatively connecting the motor with the rollers and means operated by the said roller actuating means for actuating the shiftable member.

13. A station indicator of the class described including spaced rollers, a flexible strip or ribbon connected with the rollers, a motor having a switch movable from a point in opposite directions to rotate the motor shaft in both directions, a shiftable member connected with the motor, means operatively connecting the motor with the rollers, and means actuated by the roller actuating means for moving the shiftable member in one direction and springs located at opposite sides of and adapted to be connected with the shiftable member to move the same in the opposite direction.

In testimony whereof I affix my signature in presence of two witnesses.

DAVID W. ADAMS.

Witnesses:
WILLIAM L. JOHNSON,
LYNCH GRIFFIN.